United States Patent [19]
Allen

[11] Patent Number: 6,112,144
[45] Date of Patent: *Aug. 29, 2000

[54] FIELD CHARACTERISTIC MARKING SYSTEM

[75] Inventor: Paul J. Allen, Bolingbrook, Ill.

[73] Assignee: Case Corporation, Racine, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 09/164,619

[22] Filed: Oct. 1, 1998

[51] Int. Cl.[7] .................................. G06F 7/70; G06G 7/76
[52] U.S. Cl. ................. 701/50; 701/213; 56/10.2 G; 56/10.2 R; 702/5; 250/222.1; 700/83
[58] Field of Search ................... 701/50, 35, 59, 701/200, 207, 213, 214; 702/85, 92, 93, 94, 2, 3, 5; 342/52, 53, 56; 340/870.01, 500, 600; 56/10.2 R, 10.2 G, 10.2 A, 10.2 B; 700/83; 250/222.1, 226, 559.38

[56] References Cited

U.S. PATENT DOCUMENTS

| | | | |
|---|---|---|---|
| 4,551,801 | 11/1985 | Sokol | 701/32 |
| 5,585,626 | 12/1996 | Beck et al. | 250/222.1 |
| 5,684,476 | 11/1997 | Anderson | 340/988 |
| 5,751,576 | 5/1998 | Monson | 700/83 |
| 5,862,517 | 1/1999 | Honey et al. | 702/85 |
| 5,878,371 | 3/1999 | Hale et al. | 702/2 |
| 5,899,950 | 5/1999 | Milender et al. | 701/50 |
| 5,995,895 | 11/1999 | Watt et al. | 701/50 |

*Primary Examiner*—Jacques H. Louis-Jacques
*Attorney, Agent, or Firm*—Foley & Lardner

[57] ABSTRACT

A system and method is provided for marking field characteristics, the system being supported by a work vehicle adapted to traverse a field having a plurality of observable field characteristics. The system includes an operator interface, a plurality of marker buttons coupled to the interface, a bank switch button and a controller. Each marker button is assignable to one of the plurality of field characteristics and generates a field characteristic signal representing the assigned field characteristic when pressed. The bank switch button generates a bank switch signal representing a command to reassign the marker buttons to a new set of field characteristics. The controller records the assigned field characteristic in response to the field characteristic signal and also reassigns the marker buttons in response to the bank switch signal.

20 Claims, 7 Drawing Sheets

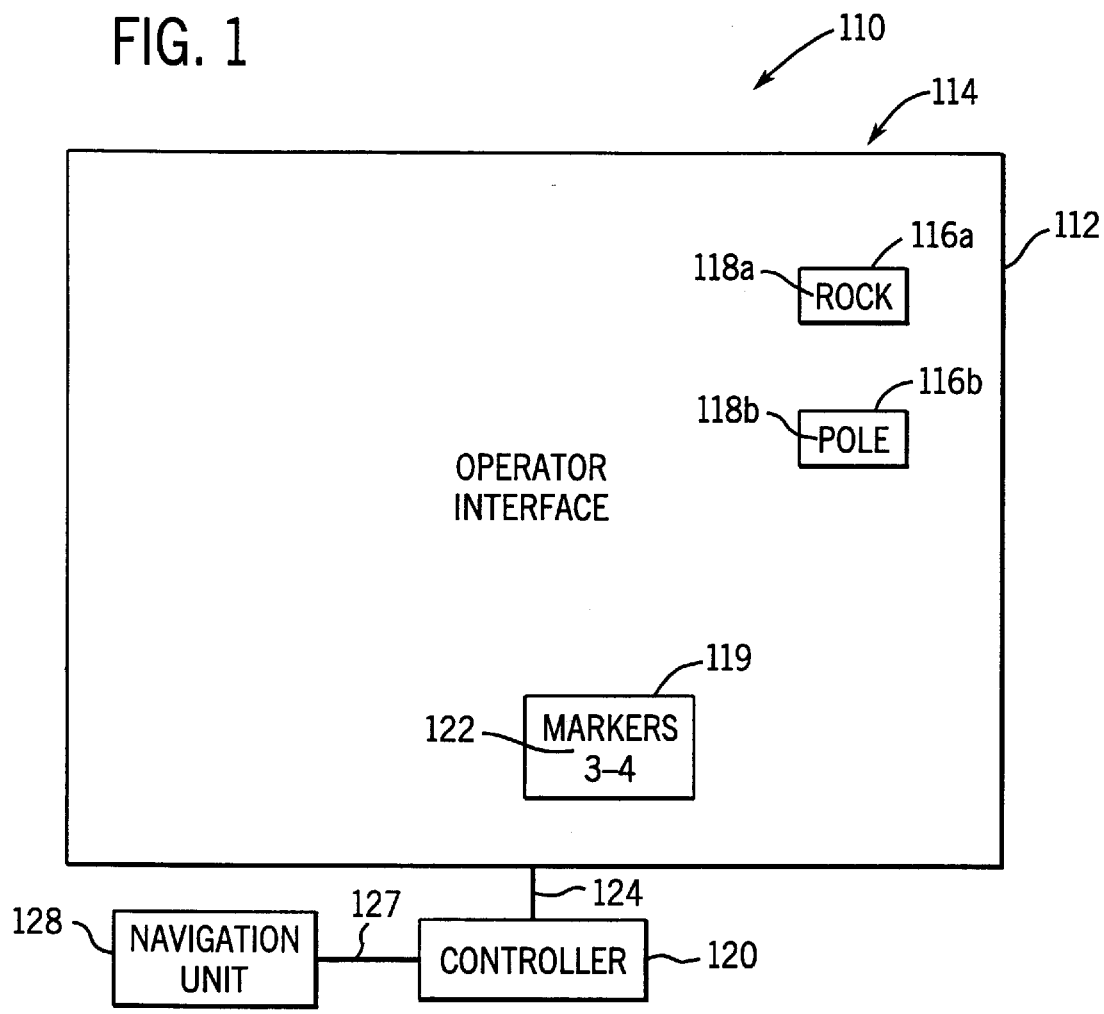

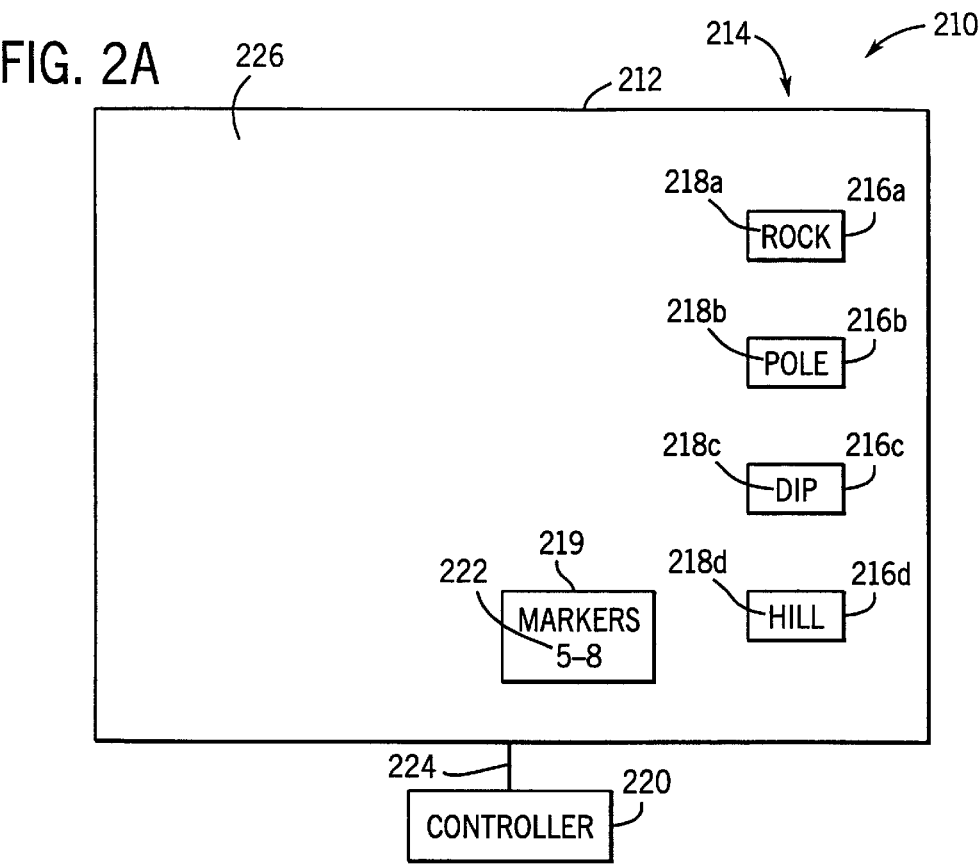
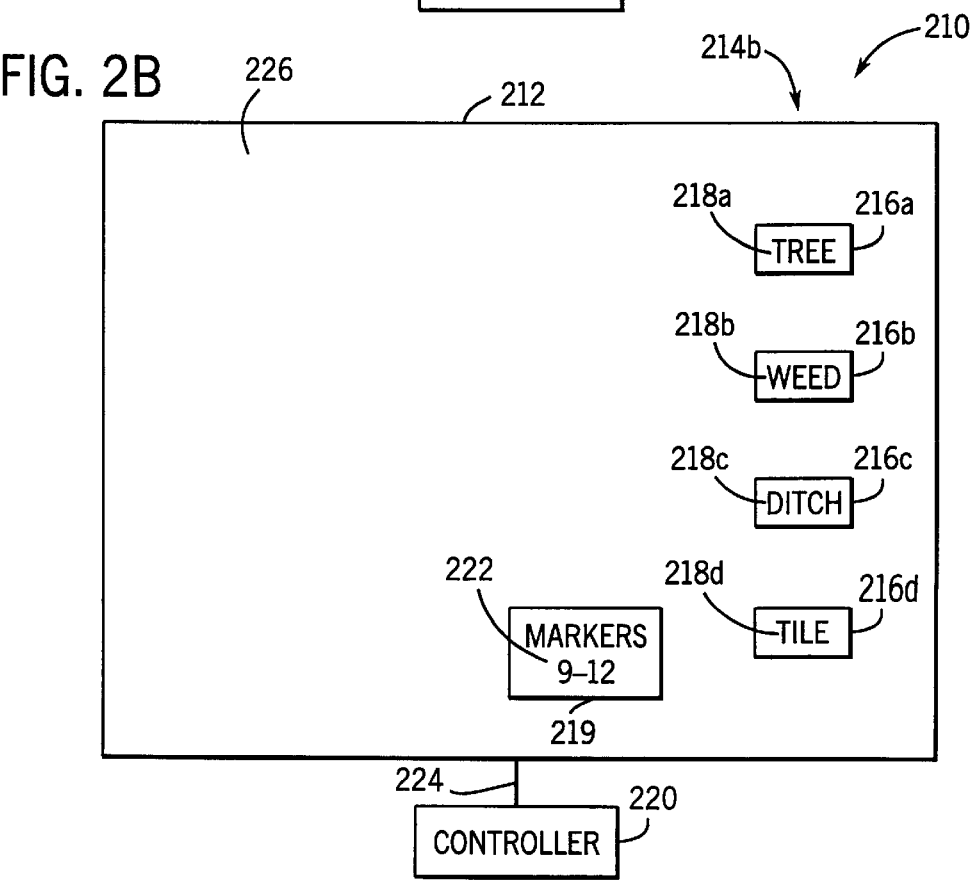

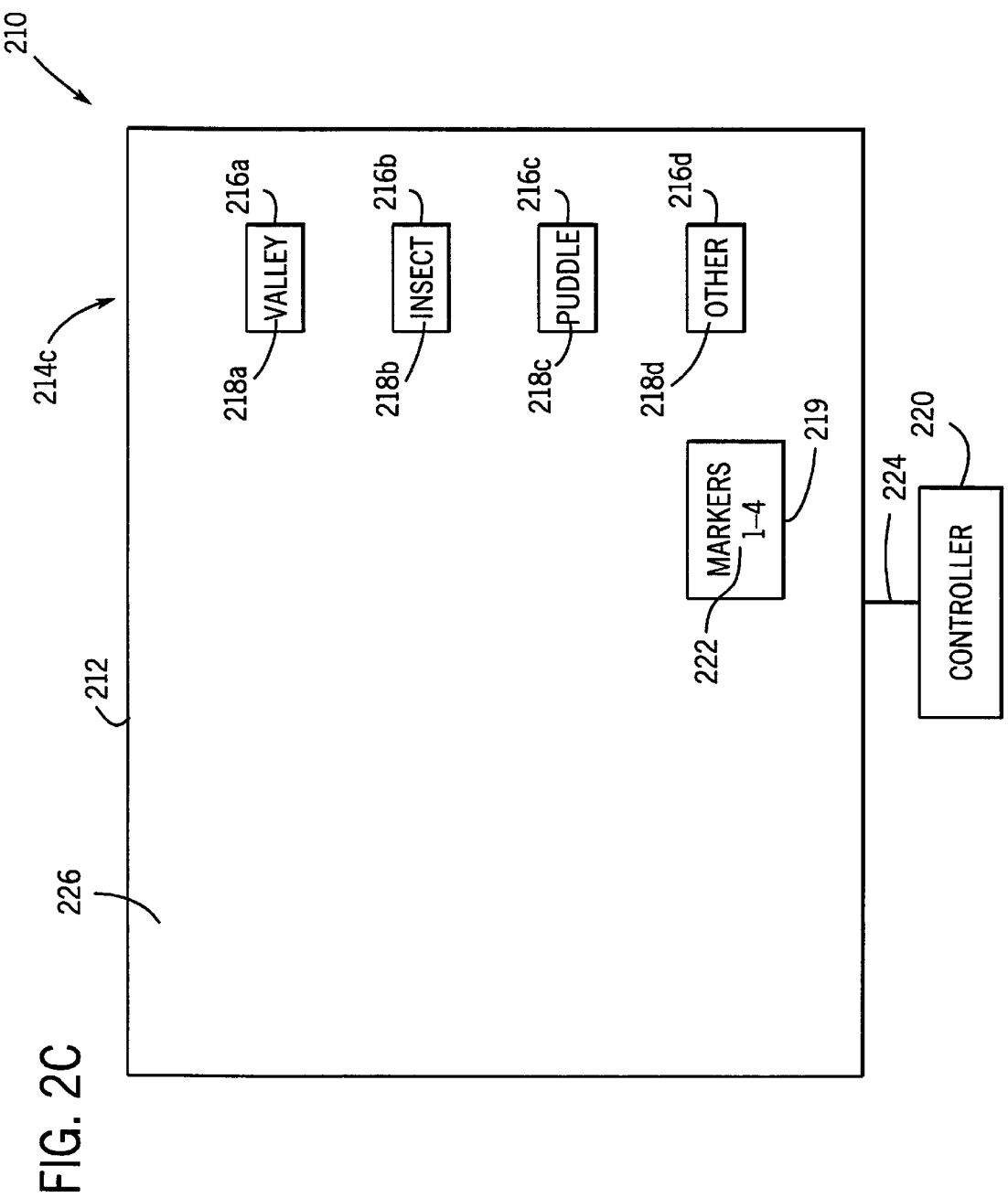

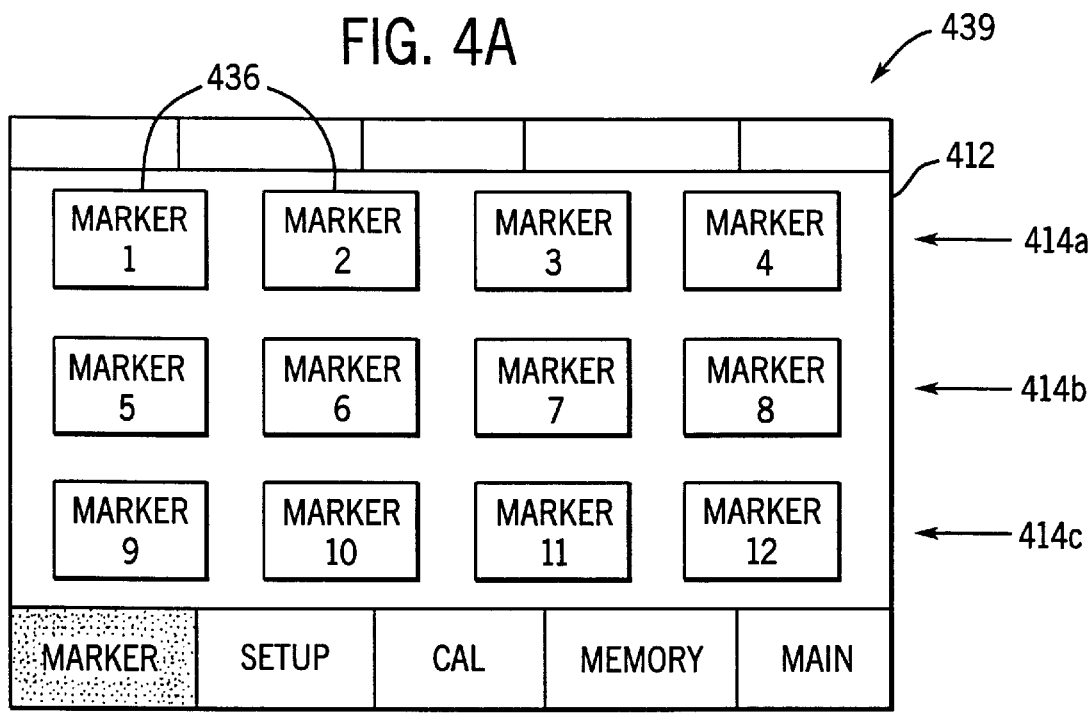
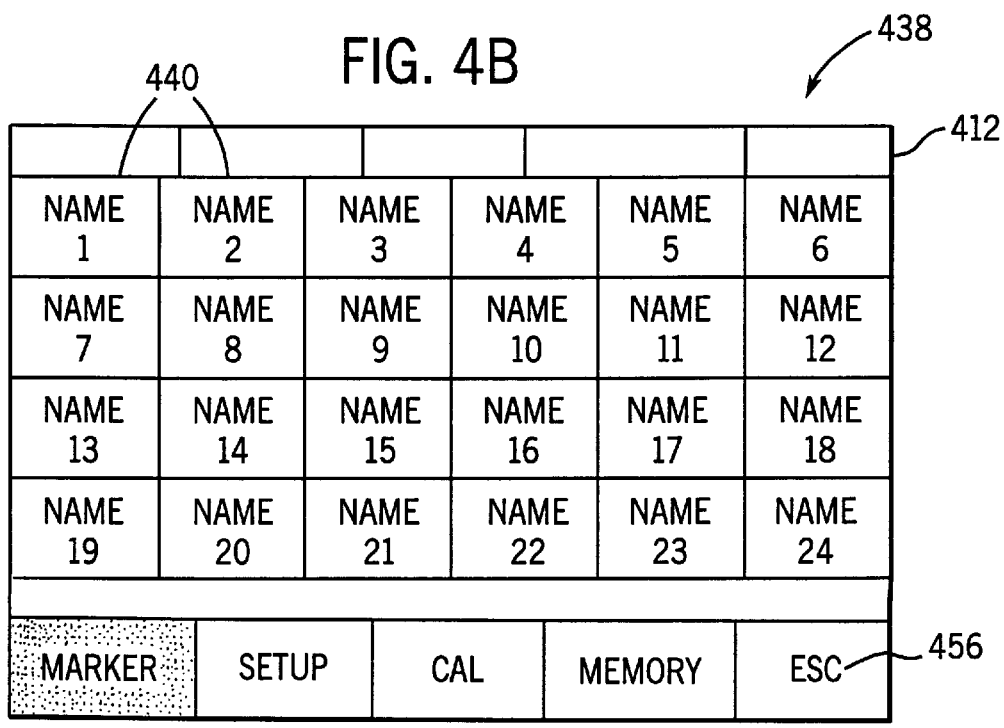

FIG. 6

FIELD CHARACTERISTIC MARKING SYSTEM

FIELD OF THE INVENTION

The present invention relates generally to agricultural or construction equipment, and more specifically to field characteristic marking systems for agricultural or construction equipment.

BACKGROUND OF THE INVENTION

The Global Positioning System (GPS) is finding many useful applications in the agricultural and construction arts. One such application is in real-time recording of characteristics of an agricultural field (e.g., crop moisture, soil content, and physical objects such as trees, rocks, etc.) These characteristics are recorded either automatically by sensors or manually by a farmer who observes a characteristic while plowing, sowing or harvesting and presses a button to record the location and identity of the characteristic. At times, the farmer may drive a vehicle around his fields for the sole purpose of recording field characteristics (e.g. recording the positions of rocks or weeds in his fields) in an operation referred to as "scouting".

The present invention relates generally to recording field characteristics manually through the use of "markers". A typical prior art system has four buttons on the user interface of a yield monitor or other controller located in the cab of an agricultural vehicle The four buttons are generally labeled (e.g., "Marker A", "Marker B", "Marker C" and "Marker D"). The farmer is required to write down or commit to memory the characteristic corresponding to each marker (e.g., Marker A=patch of weeds, Marker B=rocks, Marker C=tree, Marker D=dip). As the farmer travels the field, the farmer pushes the corresponding marker button when one of the four characteristics is observed. The controller responds by recording the location and the generic marker label. Other systems allow the farmer to program the controller with a short description of the marker (e.g., "weeds") so that the controller will record the short description instead of or along with the marker letter.

Farmers have indicated dissatisfaction with such prior art systems that have only a limited number of buttons capable of recording only a limited number of different types of field characteristics. The addition of more buttons would increase the costs of the controller and is hindered by the limited size of the controller's user interface which must also have buttons corresponding to other controller tasks. Thus, if the farmer desires to record more than four different characteristics, the farmer must stop to perform the time-consuming task of re-assigning a marker button to a new characteristic. Furthermore, as stated previously, some prior art systems only record a generic marker label (e.g., "Marker A"), instead of the actual name of the field characteristic represented by that marker. In these systems, the farmer must keep a list either mentally or on paper and match up the marker name with the field characteristic later. This drawback can cause confusion to the farmer and increase the likelihood of errors.

Thus, what is needed is a field characteristic marking system to overcome these and other problems and limitations of the prior art.

SUMMARY OF THE INVENTION

These and other needs are accomplished by the present invention which, according to one embodiment, provides a field characteristic marking system supported by a work vehicle adapted to traverse a field having a plurality of observable field characteristics. The field characteristic marking system includes an operator interface, marker buttons and a bank switch button coupled to the operator interface, and a controller coupled to the operator interface, the marker buttons, and the bank switch buttons. Each marker button is assignable to a field characteristic and generates a field characteristic signal representing the assigned field characteristic. The bank switch button generates a bank switch signal representing a command to reassign the marker buttons. The controller records the assigned field characteristic in response to the field characteristic signals and reassigns at least one of the marker buttons in response to the bank switch signal.

According to a second embodiment of the present invention, a method of marking field characteristics as a work vehicle traverses a field having a plurality of observable field characteristics is provided. The method includes pressing a marker button assigned to a first field characteristic to indicate the presence of the first field characteristic; recording the first field characteristic; pressing a bank switch button to reassign the marker button to a second field characteristic; pressing the marker button assigned to the second field characteristic to indicate the presence of the second field characteristic; and recording the second field characteristic.

According to yet another embodiment of the present invention, a field characteristic marking system supported by a work vehicle adapted to traverse a field having a plurality of observable field characteristics is provided. The system includes interface means for interfacing with an operator and marker button means assignable to a plurality of field characteristics for generating field characteristic signals representing the assigned field characteristic. The system further includes bank switch means for generating a bank switch signal representing a command to reassign the marker button means, and controller means for recording the assigned field characteristics in response to the field characteristic signals and for reassigning the marker button means in response to the bank switch signal.

Accordingly, one feature of the present invention is a marking system including an operator interface that prominently displays the field characteristic name in close proximity to each marker button so that the operator need not remember or write down the assignments.

Another feature of the present invention is a marking system including an operator interface that conserves space and hardware on the operator interface by reducing the number of marker buttons through the use of a bank switch button to reassign the field characteristic assigned to each marker button.

Yet another feature of the present invention is a marking system that allows programming of a large number of field characteristics for recall on a limited number of marker buttons.

Still another feature of the present invention is a marking system that records on a storage medium position information retrieved from a navigational system along with a field characteristic description.

BRIEF DESCRIPTION OF THE DRAWINGS

The features of the present invention which are believed to be novel are set forth with particularity in the appended claims. The invention itself, however, together with further advantages and features thereof may best be understood by one skilled in the art with reference to the following detailed description when taken in conjunction with the accompanying drawings in which like reference numerals refer to like elements, and in which:

FIG. 1 is a block diagram of a field characteristic marking system according to a preferred embodiment of the present invention;

FIGS. 2A–2C are block diagrams of a field characteristic marking system according to a second embodiment of the present invention showing the operation of a second exemplary bank switch function;

FIGS. 4A–4C are exemplary operator interface screens showing one method of programming marker buttons with field characteristics according to an exemplary embodiment of the present invention;

FIG. 6 is an exemplary operator interface screen showing marker buttons along with non-marker function buttons.

DETAILED DESCRIPTION OF EXEMPLARY EMBODIMENTS

Figure 3:
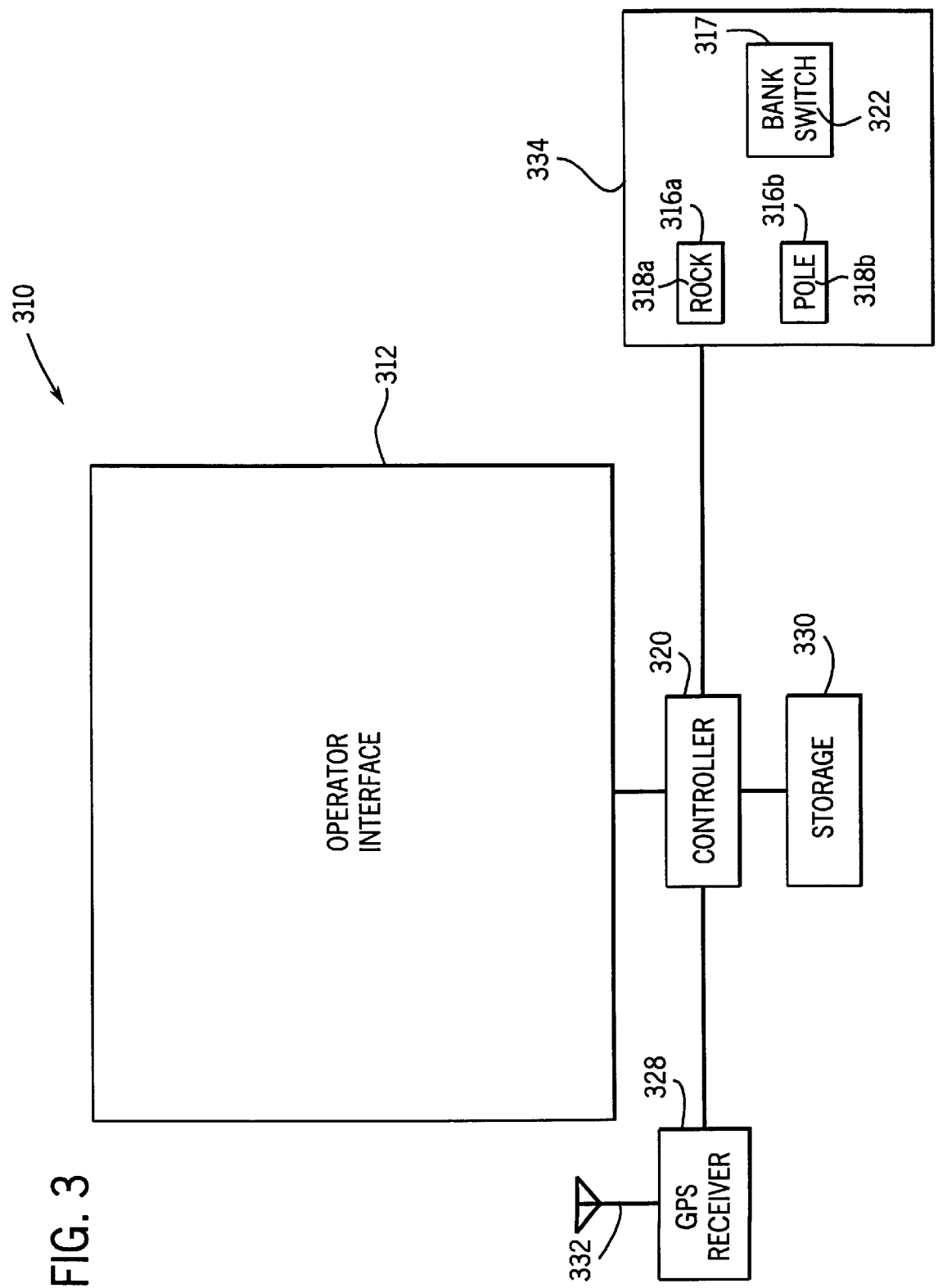
FIG. 3 is a block diagram of a field characteristic marking system according to yet another embodiment of the present invention.

Referring first to FIG. 1, a block diagram of a field characteristic marking system 110 according to a preferred embodiment of the present invention is shown. System 110 preferably comprises an operator interface 112, a bank of marker buttons 114 including a plurality of marker buttons 116a, 116b, each marker button 116a, 116b being labeled with a field characteristic indicia 118a, 118b, a bank switch button 119 being labeled with a bank indicia 122, and a controller 120. System 110 may additionally include a navigation unit 128.

Operator interface 112 is preferably located in the cab of a work vehicle and is operative to display various marker-related and non-marker related data useful to the operator and is further operative to receive input from an operator to give the operator control over various marker-related and non-marker related functioning of controller 120 and/or the work vehicle. Thus, interface 112 serves as an input or input/output device for interfacing between controller 120 and an operator. As an example, interface 112 and controller 120 may be part of a yield monitor interface unit for an agricultural combine, or interface 112 and controller 120 may be part of product application control system for an agricultural tractor.

Interface 112 preferably includes a touch screen interface, e.g., a liquid crystal display (LCD) having touch screen sensitivity. Alternatively, interface 112 may comprise a cathode ray tube (CRT), a push-button type keypad, a video screen, or other input/output devices suitable for interfacing with an operator in the cab of a work vehicle, or some combination of the foregoing. Bank of marker buttons 114 includes marker buttons 116a, 116b coupled to interface 112 and/or controller 120. While only two marker buttons 116a and 116b are depicted in bank 114 of FIG. 1, any number of marker buttons may be included in bank 114 subject to limitations as to the space available for mounting the marker buttons and as to system cost. In a preferred embodiment, bank 114 includes four marker buttons. Marker buttons 116a, 116b may be any type of input device or input/output device. In the presently preferred embodiment, marker buttons 116a, 116b are portions of the touch screen display of interface 112 designated to generate field characteristic signals and send them to controller 120 when pressed by an operator. Marker buttons 116a, 116b may also be push-button type buttons, switches, dip switches, or any other type of input device suitable for receiving operator input in the cab of a work vehicle. Marker buttons 116a, 116b may also be portions of a non-touch screen display engageable by the click of a mouse. Marker buttons 116a, 116b may further comprise an audio receiver configured to respond to the operator's voice commands if the operator identifies by voice a particular field characteristic assigned to one of marker buttons 116a, 116b, using conventional voice signal processing methods.

Field characteristic indicia 118a, 118b in the presently preferred embodiment are alphanumeric labels displayed on portions of interface 112 on, near or in the vicinity of respective marker buttons 116a, 116b. Graphical symbols (e.g., icons) may also be used. Indicia 118a, 118b are dedicated to display a field characteristic assigned to marker buttons 116a, 116b. Alternatively, field characteristic indicia 118a, 118b may be implemented using light emitting diodes (LED), 7-segment LEDs, or other visible or audible indicia to identify the field characteristic assigned to marker buttons 116a, 116b.

Controller 120 is coupled to interface 112, bank 114 and bank switch button 119 by one or more databusses 124 and provides control functions for system 110. Controller 120 may include any type of analog or digital control circuitry, including memory, an arithmetic logic unit, an interface controller unit, etc., (e.g., an Intel or Motorola microprocessor suitable for control and input/output functions).

System 110 further includes a navigation unit 128. Navigation unit 128 is coupled to controller 120 via databus 127 and provides various navigation information to controller 120, such as, instantaneous position information (e.g., latitude, longitude, and/or elevation), direction, velocity, acceleration, time of day, etc. Navigation unit 128 may comprise a global positioning system (GPS) receiver, a compass, wheel speed sensors, gyroscopes, or some combination thereof.

According to one advantageous feature of the present invention, bank switch button 119 is provided coupled to interface 112 and/or controller 120. Bank switch button 119, like marker buttons 116a, 116b may be any type of input device or input/output device. In the presently preferred embodiment, bank switch button 119 is a portion of the touch screen display of interface 112 designated to generate bank switch signals and send them to controller 120 when pressed by an operator. Bank switch button 119 may also be a push-button type button, a switch, a dip switch, or any other type of input device suitable for receiving operator input in the cab of a work vehicle. Bank switch button 119 may also be a portion of a non-touch screen display engageable by the click of a mouse. Bank switch button 119 may further comprise an audio receiver configured to respond to the operator's voice commands if the operator requests by voice a bank switch or a switch to a particular bank, using conventional voice signal processing methods.

Bank indicator 122 in the presently preferred embodiment, like field characteristic indicia 118a, 118b, is an alphanumeric or graphical label displayed on a portion of interface 112 on, near or in the vicinity of bank switch button 119. Indicator 122 is dedicated to display an indication of which bank of field characteristics is currently assigned to buttons 116a, 116b, or of which bank will be assigned to buttons 116a, 116b upon actuation of button 119. Alternatively, bank indicator 122 may also be one or more light emitting diodes (LED), a 7-segment LED, or other visible or audible indicator or indicators to identify which bank of field characteristics is or will be assigned to buttons 116a, 116b.

As stated before, field characteristic marking system 110 is supported by a work vehicle adapted to traverse a field, the field having a plurality of observable field characteristics. As the operator traverses the field in the work vehicle, when the operator identifies the presence of a field characteristic (e.g., a rock, pole, dip, hill, tree, weed, ditch, tile, valley, insect, puddle, or other field characteristic) the operator presses or otherwise engages the marker button 116a, 116b assigned to that field characteristic, as indicated to the operator by the field characteristic indicia 118a, 118b associated with the pressed marker button 116a, 116b. For example, if the operator identifies a rock, the operator engages marker button 116a, identified to the operator by field characteristic indicia 118a as "ROCK". In response, marker button 116a generates a signal indicative of the field characteristic and transmits this signal to controller 120 via bus 124. In response, controller 120 records the assigned field characteristic in response to the field characteristic signal received from marker button 116a. Additionally, controller 120 records navigation information representative of the position of the field characteristic as received from navigation unit 128 via bus 127 along with the recorded field characteristic. Accordingly, and over time, controller 120 builds a database of field characteristic information collected by the operator as the vehicle travels over the field. The database information may include data entries of the form, e.g., latitude, longitude, field characteristic, and may include a large number of data entries to create a field characteristic map. All recorded data can later be recalled either via interface 112, or via a separate storage means as described hereinbelow.

Advantageously, the operator may reassign bank 114 of marker buttons 116a, 116b to additional field characteristics. In the presently preferred embodiment, the operator can reassign bank 114 to represent additional field characteristics by pressing bank switch button 119. As shown in FIG. 1, bank indicator 122 indicates to the operator that the operator may assign a second set of field characteristics (i.e., field characteristics 3 and 4 or "MARKERS 3–4") to bank 114 by pressing bank switch button 119. If the operator wishes to make this reassignment, the operator presses bank switch button 119. In response, bank switch button 119 generates a bank switch signal representing a command to reassign at least one of marker buttons 116a, 116b. Controller 120 receives this bank switch signal and reassigns at least one of marker buttons 116a, 116b in response to the bank switch signal. Controller 120 changes field characteristic indicia 118a, 118b to indicate the new assignments of field characteristics to marker buttons 116a, 116b, and controller 120 also changes bank indicator 122 to indicate to the operator that the operator may assign a third set (or return to the first set) of field characteristics (e.g., field characteristics 5 and 6 or "MARKERS 5–6") to bank 114 by pressing bank switch button 119. Alternatively, bank indicator 122 may change to indicate which bank of field characteristics is currently assigned to marker buttons 116a, 116b. Thus, the operator can scroll through different banks of field characteristics assigned to marker buttons 116a, 116b by repeatedly pressing bank switch button 119.

Referring now to FIGS. 2A–2C, block diagrams of a field characteristic marking system 210 according to a second embodiment of the present invention showing the operation of a second exemplary bank switch function are shown. Referring first to FIG. 2A, system 210 includes an exemplary operator interface 212 coupled to a controller 220. Preferably, interface 212 is a touch screen LCD having portions thereof designated for a bank of marker buttons 214 including marker buttons 216a, 216b, 216c, 216d, field characteristic indicia 218a, 218b, 218c, 218d, a bank switch button 219, and a bank indicator 222. Interface 212 also includes a portion 226 reserved for non-marker interface functions, such as, tractor functions (e.g., an implement up-down control button) or combine functions (e.g., displays of instantaneous and average yield, crop moisture, etc.). Field characteristic indicia 218a, 218b, 218c, 218d and bank indicator 222 are preferably located in the center of marker buttons 216a, 216b, 216c, 216d and bank switch button 219, respectively, for displaying the assignments of buttons 216a, 216b, 216c, 216d and 219.

With reference to FIGS. 2A–2C, a system and method according to the present invention of reassigning bank 214 of marker buttons 216a, 216b, 216c, 216d with various field characteristics will now be described. In FIG. 2A, bank 214 includes field characteristics "ROCK", "POLE", "DIP" and "HILL" assigned to marker buttons 216a, 216b, 216c, 216d, respectively, as indicated by field characteristic indicia 218a, 218b, 218c, 218d, respectively. Bank indicia 222 indicates to the operator that additional field characteristics may be assigned to marker buttons 216a, 216b, 216c, 216d by pressing bank switch button 219. In the presently preferred embodiment, pressing bank switch button 219 will reassign marker buttons 216a, 216b, 216c, 216d to field characteristics 5–8 (i.e., "MARKERS 5–8") as indicated by bank indicator 222. As with the embodiment of FIG. 1, when the operator presses bank switch button 219, button 219 generates a bank switch signal representing a command to reassign at least one of the marker buttons and sends the bank switch signal to controller 220 via bus 224. Controller 220 responds by recalling from memory or other storage additional field characteristics (up to four in this embodiment). Controller 220 generates signals to reassign marker buttons 216a, 216b, 216c, 216d to the new field characteristics, to change the displayed field characteristic indicia 218a, 218b, 218c, 218d to correspond to the new field characteristics, to reassign bank switch button 219 to the next set of field characteristics, and to change the displayed bank switch indicator 222 to correspond to the next bank of field characteristics.

FIG. 2B shows how interface 212 appears after the operator has pressed bank switch button 219. In FIG. 2B, marker buttons 216a, 216b, 216c, 216d have been reassigned to field characteristics 5–8 which are, as indicated by field characteristic indicia 218a, 218b, 218c, 218d, "TREE", "WEED", "DITCH", and "TILE". Bank indicia 222 also has changed to indicate that pressing bank switch button 219 when viewing interface 212 as depicted in FIG. 2B will result in displaying field characteristics 9–12 (i.e., "MARKER 9–12"). Typically, pressing button 219 will not have an effect on portion 226 of interface 212.

System 210 as depicted in FIG. 2B may function in much the same way as system 210 as depicted in FIG. 2A. While viewing interface 212 as depicted in FIG. 2B, the operator may press any of marker buttons 216a, 216b, 216c, 216d to indicate to controller 120 the presence of the field characteristic identified by field characteristic indicia 218a, 218b, 218c, 218d. For example, upon viewing a patch of weeds at the work vehicle's current location, the operator may press marker button 216b, identified as a patch of weeds by field characteristic indicia 218b. As in the embodiment of FIG. 1, pressing any of marker buttons 216a, 216b, 216c, 216d will cause that marker button to generate a field characteristic signal representing the assigned field characteristic and send this field characteristic signal over bus 224 to controller 220 at which time controller 220 will record the assigned field characteristic in response to receiving the field characteristic signal, along with navigation data from a navigation unit (not shown in FIG. 2A).

Referring now to FIG. 2C, as with the switch from FIG. 2A to FIG. 2B, if the operator wishes to record the presence of a field characteristic not listed in field characteristics 5–8, the operator presses bank switch button 219 (as depicted in FIG. 2B), which again generates a bank switch signal representing a command to reassign at least one of marker buttons 216a, 216b, 216c, 216d and transmits this bank switch signal over bus 224 to controller 220. Controller 220 responds by recalling from memory or other storage additional field characteristics (up to four more in this embodiment). Controller 220 generates signals to reassign marker buttons 216a, 216b, 216c, 216d to the new field characteristics (i.e., field characteristics 9–12), to change the displayed field characteristic indicia 218a, 218b, 218c, 218d to correspond to the new field characteristics, to reassign bank switch button 219 to the next set of field characteristics (or, in this case, to wrap around to the first set of field characteristics, i.e., "MARKERS 1–4"), and to change the displayed bank switch indicator 220 to correspond to the first set of field characteristics. As shown in FIG. 2C, field characteristics 9–12 are assigned to "VALLEY", "INSECT", "PUDDLE", and "OTHER". The word "OTHER" indicates that any other desired field characteristic may be assigned in addition to or in substitution of one or more of those field characteristics listed in FIGS. 2A–2C. With respect to FIG. 2C, again portion 226 of interface 212 typically remains unaffected by the operation of controller 220 in reassigning marker buttons 216a, 216b, 216c, 216d to field characteristics 9–12. Another actuation of bank switch button 219 (as depicted in FIG. 2C) brings system 210 back to the state depicted in FIG. 2A.

Thus, it can be seen that an operator may cycle or scroll through a plurality of sets of field characteristics (e.g., "MARKERS 1–4", "MARKERS 5–8" and "MARKERS 9–12") by repeatedly depressing or otherwise engaging bank switch button 219. Accordingly, for each set displayed, controller 220 will record only the field characteristic displayed at the time the corresponding marker button is pressed and controller 220 will not record other field characteristics that were previously assigned to the marker button at the time the marker button was pressed.

Referring now to FIG. 3, a block diagram of yet another embodiment of the field characteristic marking system of the present invention is shown. Field characteristic marking system 310 is similar to system 110 of FIG. 1 in that it includes an operator interface 312 and a controller 320. System 310 further includes a storage means 330 coupled to controller 320. Storage means 330 could be any type of digital or analog memory, including a hard disk drive, a floppy disk drive, magnetic tape, random access memory (RAM), erasable programmable read-only memory (EPROM), a PCMCIA card, etc. Additionally, a GPS receiver 328 including a GPS antenna 332 is coupled to controller 320 for communication therewith. Also, a remote device 334 is coupled to controller 320 for input or input/output therewith, remote device 334 including a plurality of marker buttons 316a, 316b and a plurality of field characteristic indicia 318a, 318b associated with the plurality of marker buttons 316a, 316b. Remote device 334 also includes a bank switch button 319 having a bank indicator 322 associated therewith.

System 310 provides several advantages and features in addition to those found in system 110 of FIG. 1. The addition of storage 330 allows controller 320 to build a database of field characteristic information collected by the operator as the operator travels the field. The database information may include data entries of the form, e.g., latitude, longitude, field characteristic, and may include a large number of data entries to create a field characteristic map. All recorded data can be stored by controller 320 either while the operator is scouting the field or after a period of accumulation of data in the memory of controller 320. Additionally, controller 320 can format the data in a variety of formats depending on the desired use. For example, controller 320 may download field characteristic data entries in response to the operator pressing a download button (not shown) coupled to interface 312. At this time, controller 320 may format the data (e.g. in a geographic information system (GIS) database format) and download this data to storage 330, which may be a PCMCIA card. Thus, the data can subsequently be used on a farm personal computer (PC) or other computing apparatus.

The addition of GPS receiver 328 as a specific example of navigation unit 128 allows instantaneous access by controller 320 to the real-time position of the work vehicle. This real-time position information can be in the form of a latitude, longitude coordinate, or other x,y position such as a relative position, or in the form of a latitude, longitude, elevation coordinate, i.e. an x, y, z coordinate. Position information and perhaps other navigation information (e.g., direction) may be transmitted from receiver 328 to controller 320 for use by controller 320 along with field characteristic signals received from device 334 (or interface 112 of the embodiment in FIG. 1) to build a database of field characteristics. This database may be a land area map and may contain a large number of various field characteristics. System 310 may also utilize differential global positioning (DGPS) by the addition of a second antenna and additional circuitry to GPS receiver 328 and antenna 332 to receive correction signals from a remote source (not shown) to improve the accuracy of the navigation information.

An additional novel feature of the present invention is found in the use of remote device 334. Remote device 334 offers numerous additional advantages and features of the present invention. Remote device 334 may be located closer to the operator of a work vehicle than interface 312 or may be hand held or also may be adapted for mounting separate from interface 312 on a work vehicle. This may allow system 310 to more ergonomically interact with the operator. Additionally, interface 312 will contain additional space for non-marker or other marker input/output functions. Remote device 334 may be a keypad, a touch-screen interface, an LCD interface, switches, dip switches, LEDs, or some combination thereof or some other input/output or input device having marker buttons 316a–b and a bank switch button 319 that operate much like their counterparts in systems 210 or 310 in the embodiments of FIG. 1 and FIG. 2. Alternatively, field characteristic indicia 318a, 318b may be located on interface 312 while the marker buttons 316a, 316b to which the field characteristics are assigned may be located on the remote device 334.

Figure 4C:
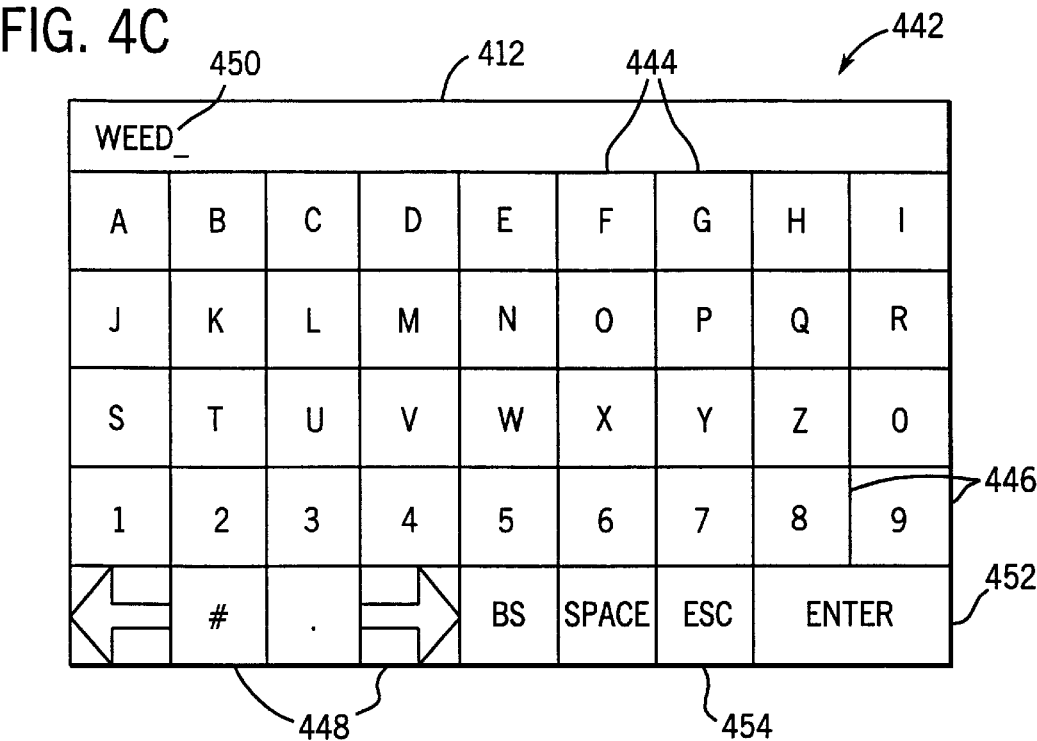

Referring now to FIGS. 4A–4C, exemplary operator interface screens showing one method of programming marker buttons with field characteristics according to an exemplary embodiment of the present invention are shown. While this programming can be done at the factory when the system is manufactured, the present invention may have the additional benefit of allowing the operator to customize field characteristics based on commonly encountered field characteristics or other convenience factors. In this embodiment, up to twenty-four field characteristics may be stored in the system. Up to twelve of these field characteristics may be programmed individually to one of three sets of field characteristics, each set having four field characteristics. Upon power-up of the system, a default set of programmings may be made, or no programmings may be made.

Referring first to FIG. 4A, an operator interface 412 showing an exemplary field characteristic set-up screen is shown. In this exemplary embodiment, three sets 414a, 414b, 414c of field characteristics are programmable. During operation, the operator is initially presented with the first set 414a (i.e., "MARKERS" 1–4) and may then cycle through the second set 414b and the third set 414c as described hereinabove with reference to FIGS. 2A–2C. To program a field characteristic, the operator presses one of the marker buttons 436. Marker buttons 436 are preferably select portions of a touch screen interface 412, but may also be other types of input devices as discussed hereinabove. Pressing one of marker buttons 436 causes the marker button pressed to send a signal to a controller (not shown) such as controller 120 indicating that the operator wishes to program a field characteristic for that marker button 436. The controller then changes interface 412 to display a name screen 438 as shown in FIG. 4B. From name screen 438, it can be seen that up to twenty-four names may be stored in the system of the present invention, though more or less names may be stored in alternative embodiments. From name screen 438, the operator selects the name button 440 that the operator wishes to name. Pressing a name button 440 sends a signal to the controller to indicate that the operator wishes to enter a name for the name button 440 pressed. The controller responds by displaying a name entry screen 442 on interface 412 as shown in FIG. 4C containing letter buttons 444, number buttons 446 and other functional buttons 448 such as an ENTER button 452 and an ESCAPE button 454.

From screen 442, the operator may enter a name 450 (e.g., "WEED") for the selected name button 440. After typing the name, the ENTER button 452 is pressed which causes the controller to program name button 440 with the name entered and also to program marker button 436 with the name entered. The controller then returns the operator to screen 439 (FIG. 4A) and the selected marker button 436 now displays name 450 entered by the operator. The selected name button 440 now displays name 450 as well.

From screen 442, if ESCAPE button 454 is pressed after a name 450 is entered, the operator is returned to screen 438. Although the selected name button 440 is programmed with the name 450, the selected marker button 436 is not so programmed. The selected marker button 436 is programmed only if the operator presses ENTER button 452 from screen 442. Thus, ESCAPE button 454 of screen 442 allows the operator to return to screen 438 and program multiple name buttons 440 without programming any of marker buttons 436. When the operator is finished selecting names in name screen 438, pressing an ESCAPE button 456 will return the operator to screen 439 without affecting any of marker buttons 436. Naturally, this method is merely an exemplary method of programming a plurality of marker buttons with field characteristics.

Figure 5:
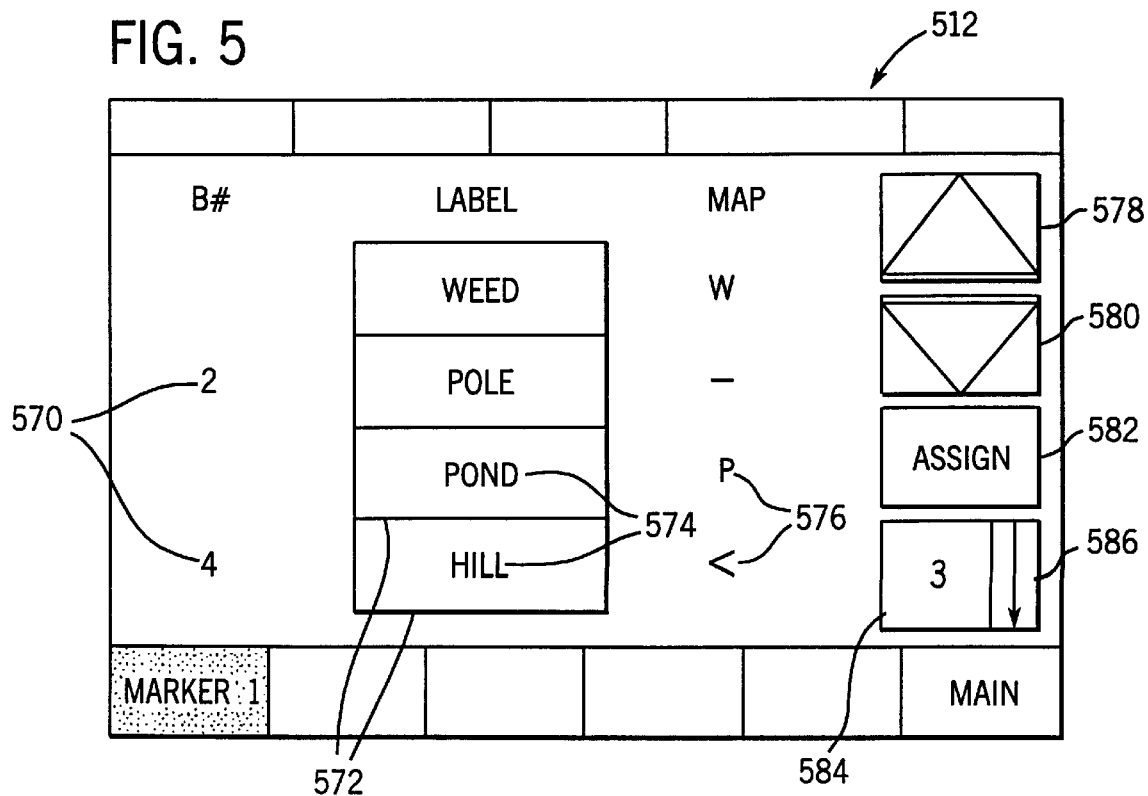
FIG. 5 is an exemplary operator interface screen showing another method of programming marker buttons with field characteristics according to an exemplary embodiment of the present invention.

Another method of programming marker buttons with field characteristics according to an exemplary embodiment of the present invention is shown in the operator interface screen of FIG. 5. An operator interface 512 is part of a field characteristic marking system that requires a minimal amount of controller and/or storage memory to store field characteristic data through the use of button numbers. While the field characteristic marking system of FIGS. 4A–4C has improved flexibility because it allows the operator to enter customized field characteristic names, storage of ASCII characters for each letter in the names requires a relatively large amount of memory space which may not be available in some embodiments of the present invention. Accordingly, a system having operator interface 512 greatly reduces the amount of memory space required with only a modest surrender of functionality.

Referring to FIG. 5, operator interface 512 comprises a plurality of label buttons 572, each having an associated indicia 574, button number field 570 and map icon 576. Interface 572 also includes a field characteristic bank increment button 578, a field characteristic bank decrement button 580, an assign button 582 and a list box 584 having an associated list box increment button 586. The operator may scroll through a field characteristic label list stored in the controller (not shown) having a total of three banks of field characteristics (in an exemplary embodiment having twelve total field characteristics), four at a time, as indicated by indicia 574, by pressing either increment button 578 or decrement button 580. Label buttons 572 first are assigned to four original field characteristics (e.g., "WEED", "ROCK", "POND", "ROAD"). One press of increment button 578 will reassign label buttons 572 to four additional pre-programmed field characteristics, which will appear at indicia 574. A second press of increment button 578 will reassign label buttons 572 to four more pre-programmed field characteristics, which will appear at indicia 574. A third press of increment button 578 will reassign label buttons 572 to the original field characteristics. Pressing decrement button 580 instead of increment button 578 will allow the operator to scroll through the field characteristic label list similarly, but in the opposite direction. As the operator scrolls through the field characteristics, each field characteristic's associated map icon 576 will be displayed as well. This map icon 576 may be used as a shorthand symbol in maps created using the marker data stored according to the present invention.

Button numbers displayed in button number field 570 indicate the order in which field characteristics will be displayed to the operator during field characteristic marking (e.g., scouting), as described hereinabove with reference to FIGS. 1 and 2. Thus, field characteristics having button numbers 1 through 4 will be displayed on interface 212 first (see FIG. 2A). To view field characteristics 5 through 8, the operator presses bank switch button 222. As an example, field characteristics "POLE" and "HILL" are programmed to button numbers 2 and 4, respectively (see FIG. 5), and will be assigned in the first interface screen 212 (as shown in FIG. 2A) to the second and fourth label buttons 216b, 216d, respectively. The button numbers also indicate which field characteristics have been observed by the operator during marking and are stored along with the position information received from a navigation unit. Thus, the button numbers act as a shorthand representation of the actual field characteristic name which, in ASCII, may require too much memory to store in some embodiments of the present invention.

To program a field characteristic with a button number, the operator first presses the label button 572 displaying the desired field characteristic on the label button's associated indicia 574. This will cause the indicia 574 of the pressed label button 572 to switch to inverse video (i.e., black background and white lettering) to indicate to the operator that the pressed label button 572 is selected. The operator then presses list box increment button 586 until list box 584 displays the desired button number (e.g., "3"). The operator then presses the assign button 582 to assign the button number displayed in list box 584 to the selected field characteristic. If the desired button number is already being used in association with another field characteristic, the other field characteristic will become unassigned. The operator may proceed to program, in this embodiment, up to twelve field characteristics to button numbers one through twelve. Of course, other embodiments may include fewer than twelve or more than twelve field characteristics.

During scouting or other field characteristic marking, each time the operator presses one of the plurality of marker buttons 216a, 216b, 216c, 216d (see FIG. 2A), a data message is sent from the operator interface to the controller. The message includes a field characteristic signal representing the field characteristic assigned to the pressed marker button. In response, the controller receives position information from the navigational unit and, rather than storing the entire ASCII word associated with the field characteristic, stores only the button number, one through twelve, as programmed by the operator and as described above. This greatly reduces the size of each field characteristic marker message stored. When the controller downloads the field characteristic marker data to storage device (e.g., a PCMCIA card), the controller also downloads an index file. The index file can also be relatively small, because the index file need only store the programmed button numbers along with a numerical indication of their associated field characteristics. The numerical indication of associated field characteristics can be a pre-established standard (e.g., 1=pond, 2=weed, 3=rock, 4=road, etc.). The farm PC and controller will already know the pre-established standard. Therefore, when the data is downloaded from the PCMCIA card to a farm PC (or uploaded to the controller for displaying on the interface), the controller will use the pre-established standard to assign a field characteristic name or label (e.g., "ROCK") to the button number in each field characteristic marker message.

The index file may further record a field number, representing the agricultural field being scouted, and may maintain indexes of button numbers to numerical indications for each individual field, allowing the operator to create customized label button configurations for each field being scouted.

Also, the controller of the present invention may perform agricultural yield monitoring functions. In a yield monitoring configuration, a yield data message is stored periodically (e.g., every second), the yield message having a yield data portion (e.g., crop moisture, crop yield, etc.), a position portion, and a marker portion. If no marker button is being pressed, the marker portion of the message includes no data. If a marker button is pressed, the marker portion includes a binary representation of the button number, one through twelve, that the operator observed at that position. The binary representation could be a single bit of a 12 bit-long message (again, for a system having twelve field characteristics) or a binary coded decimal (BCD) representation.

Figure 6:
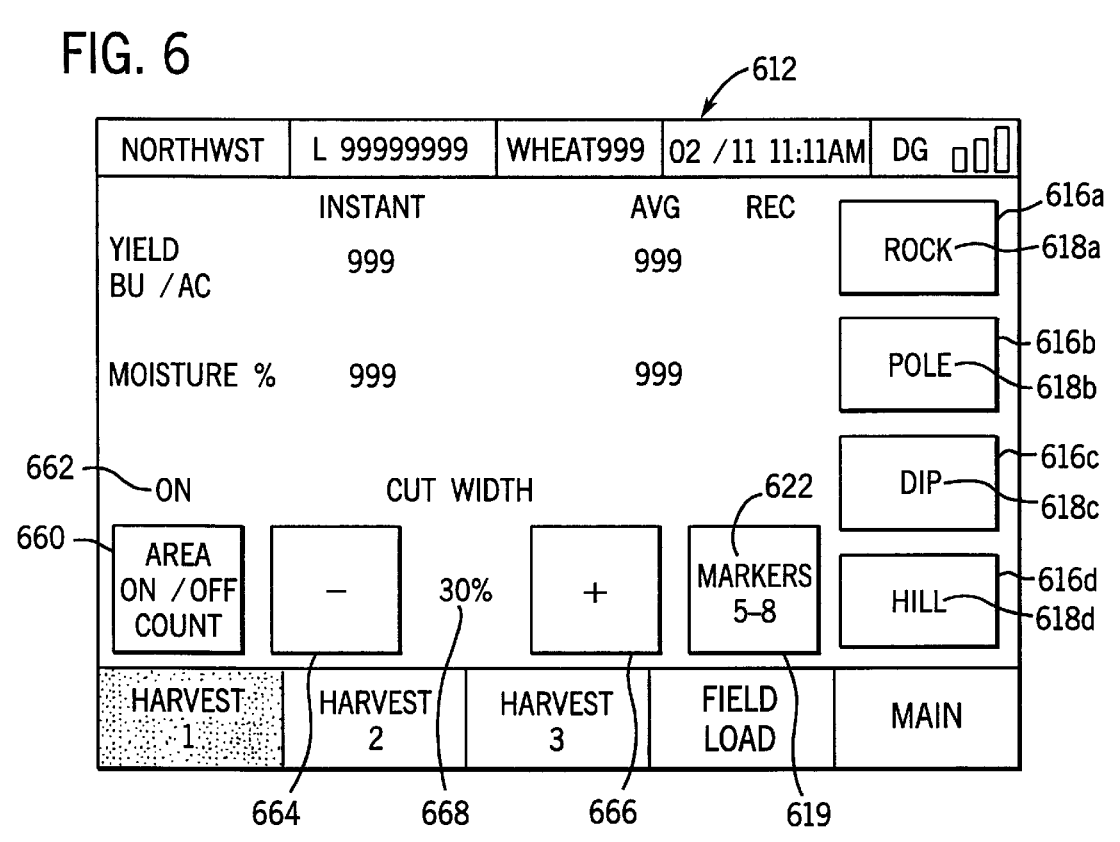

Finally, with reference to FIG. 6, an operator interface 612 is shown according to yet another embodiment of the present invention having marker buttons 616a, 616b, 616c, 616d, a bank switch button 619, their associated indicia 618a, 618b, 618c, 618d and 622, and non-marker function buttons. One example of a non-marker function button is an area on/off button 660. In a combine, this button allows the operator to begin or end counting the area covered by the combine while harvesting. An area on/off state indicator 662 indicates the present state (i.e., on or off) of the area count as set by area on/off button 660. FIG. 6 also shows buttons 664 and 666 for decreasing or increasing the cut width of a header associated with the combine, as well as an indicator 668 representing the current cut width. Also shown in FIG. 6 are various other indicia, e.g., moisture percent of harvested crop and yield of harvested crop. Thus, FIG. 6 shows how the marker buttons and bank switch button of the present invention may be used in conjunction with non-marker buttons and indicators. FIG. 6 also shows how the present invention reduces the display size required to display a large plurality of field characteristic markers (e.g., the entire screen in FIG. 4A) to a screen that allows numerous non-marker functions (e.g., the screen of FIG. 6) while still maintaining the convenience of a system having a large plurality of field characteristic markers.

It is understood that, while the detailed drawings and specific examples given describe preferred exemplary embodiments of the present invention, they are for the purpose of illustration only. The present invention is not limited to the precise details, methods, materials and conditions disclosed. For example, while pressing a marker button in the present invention indicates the presence of a field characteristic at a finite location, the marker button could also be pressed to indicate the presence of a field characteristic over a continuum, e.g., by pressing the button at the beginning of a field characteristic and pressing the button again to indicate the end of a field characteristic, or the button could be pressed and held until the field characteristic no longer exists. Further, while the presently preferred method of programming field characteristics to marker buttons 436 utilizes a touch screen interface, names may also be programmed using a standard keyboard and/or mouse, or by pressing additional buttons or dip switches. Accordingly, the present invention is not to be limited to any specific embodiment herein, but rather is to extend to all embodiments now known or later developed that fall within the spirit and scope of the present invention as defined by the claims appended hereto.

What is claimed is:

1. A field characteristic marking system supported by a work vehicle adapted to traverse a field having a plurality of observable field characteristics, the field characteristic marking system comprising:

an operator interface;

a plurality of marker buttons coupled to the operator interface, each marker button assignable to one of the plurality of field characteristics and configured to generate a field characteristic signal representing the assigned field characteristic;

a bank switch button coupled to the operator interface and configured to generate a bank switch signal representing a command to reassign at least one of the marker buttons; and a controller coupled to the operator interface, the marker buttons and the bank switch button, the controller being configured to record the assigned field characteristic in response to the field characteristic signals and to reassign at least one of the marker buttons in response to the bank switch signal.

2. The field characteristic marking system of claim 1, wherein at least one of the marker buttons and the bank switch button is located on a remote keypad.

3. The field characteristic marking system of claim 1, wherein the operator interface includes a touch screen and wherein at least one of the marker buttons and the bank switch button is located on the touch screen.

4. The field characteristic marking system of claim 1, wherein the assigned field characteristics are displayed in proximity to the respective marker buttons.

5. The field characteristic marking system of claim 1, further comprising a navigation unit coupled to the controller, the navigation unit configured to generate position signals representing the positions of the work vehicle in the field, the controller further configured to record the position signal received from the navigation unit when one of the marker buttons is actuated along with the assigned field characteristic of the actuated marker button.

6. The field characteristic marking system of claim 5, further comprising a storage device, the controller storing the position signal and the assigned field characteristic on the storage device to generate a database of field characteristic data thereon.

7. The field characteristic marking system of claim 5, wherein the navigational receiver includes a global positioning system (GPS) receiver.

8. The field characteristic marking system of claim 1, wherein the controller reassigns the marker buttons in response to the bank switch signal based upon operator-programmed selections.

9. The field characteristic marking system of claim 8, wherein the controller stores a greater number of field characteristic names than are available to the controller for reassigning.

10. A method of marking field characteristics as a work vehicle traverses a field having a plurality of observable field characteristics, the method comprising:

pressing a marker button assigned to a first field characteristic to indicate the presence of the first field characteristic;

recording the first field characteristic;

pressing a bank switch button to reassign the marker button to a second field characteristic;

pressing the marker button reassigned to the second field characteristic to indicate the presence of the second field characteristic; and recording the second field characteristic.

11. The method of claim 10, wherein the marker button is a portion of a touch screen display.

12. The method of claim 10, wherein the step of pressing a bank switch button includes reassigning an indicator in close proximity to the marker button, the indicator displaying a user-recognizable name indicative of the first field characteristic before the step of pressing a bank switch button and the indicator displaying a user-recognizable name indicative of the second field characteristic after the step of pressing a bank switch button.

13. A field characteristic marking system supported by a work vehicle adapted to traverse a field having a plurality of observable field characteristics, the field characteristic marking system comprising:

interface means for interfacing with an operator;

marker button means assignable to a plurality of field characteristics for generating field characteristic signals representing the assigned field characteristics;

bank switch button means for generating a bank switch signal representing a command to reassign the marker button means; and controller means for recording the assigned field characteristics in response to the field characteristic signals and for reassigning the marker button means in response to the bank switch signal.

14. The field characteristic marking system of claim 13, wherein the marker button means is located at least partially on a remote keypad.

15. The field characteristic marking system of claim 13, wherein the interface means includes a touch screen and wherein the marker button means and the bank switch button means are located on the touch screen.

16. The field characteristic marking system of claim 13, wherein the assigned field characteristics are displayed in proximity to the marker button means.

17. The field characteristic marking system of claim 13, further comprising navigational means for generating a position signal representing the position of the work vehicle in the field, the controller means recording the position signal received from the navigational means when one of the marker button means is actuated along with the assigned field characteristic of the actuated marker button means.

18. The field characteristic marking system of claim 17, wherein the navigational means includes a global positioning system (GPS) receiver.

19. The field characteristic marking system of claim 17, further comprising a storage device, the controller means storing the position signal and the assigned field characteristic on the storage device to generate a database of field characteristic data thereon.

20. The field characteristic marking system of claim 13, wherein the controller reassigns the marker button means in response to the bank switch signal based upon operator-programmed selections.

* * * * *